(12) United States Patent
Nada

(10) Patent No.: US 6,854,881 B2
(45) Date of Patent: Feb. 15, 2005

(54) METHOD OF ESTIMATING TEMPERATURE AND DEVICE FOR THE EFFECTING SAME

(75) Inventor: Mitsuhiro Nada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 49 days.

(21) Appl. No.: 09/851,387

(22) Filed: May 9, 2001

(65) Prior Publication Data

US 2002/0006154 A1 Jan. 17, 2002

(30) Foreign Application Priority Data

May 9, 2000 (JP) ........................................ 2000-136001

(51) Int. Cl.[7] .............................. G01K 7/00; G01K 1/16; G01K 17/00
(52) U.S. Cl. ........................ 374/169; 374/164; 374/141; 374/152; 374/32; 324/500; 324/765
(58) Field of Search ................................ 374/164, 153, 374/169, 141, 148, 145, 32, 36, 152; 702/108, 109, FOR 138, 103; 324/500, 765

(56) References Cited

U.S. PATENT DOCUMENTS

| | | | |
|---|---|---|---|
| 3,622,849 A | | 11/1971 | Kelly, Jr. et al. |
| 4,330,809 A | * | 5/1982 | Stanley ........................ 361/103 |
| 4,426,960 A | * | 1/1984 | Hart .......................... 123/41.49 |
| 4,442,821 A | * | 4/1984 | Hamai et al. ................. 123/639 |
| 4,949,078 A | * | 8/1990 | Ito et al. ....................... 340/635 |
| 5,224,565 A | * | 7/1993 | Tamura et al. ............... 180/197 |
| 5,778,662 A | * | 7/1998 | Mori et al. ..................... 60/274 |
| 5,920,617 A | | 7/1999 | Berger et al. |
| 5,923,135 A | * | 7/1999 | Takeda ........................ 318/432 |
| 6,091,324 A | * | 7/2000 | Arsenault et al. ........... 340/449 |
| 6,286,996 B1 | * | 9/2001 | Molander ..................... 374/152 |
| 6,348,672 B2 | * | 2/2002 | Eisenhardt et al. .......... 219/202 |
| 6,414,832 B1 | * | 7/2002 | Crecelius et al. ............ 361/120 |

FOREIGN PATENT DOCUMENTS

| | | | |
|---|---|---|---|
| DE | 19641074 | 4/1998 | |
| DE | 196 41 074 | 4/1998 | |
| DE | 198 06 135 | 8/1999 | |
| DE | 198 52 080 | 8/2000 | |
| DE | 19852080 C1 * | 8/2000 | ............ G01K/3/08 |
| EP | 0 826 951 | 3/1998 | |
| EP | 0 978 640 | 2/2000 | |
| FR | 2 096 444 | 2/1972 | |
| JP | 2-60151 | 2/1990 | |
| JP | 2-136465 | 11/1990 | |
| JP | 5-502303 | 4/1993 | |
| JP | 5-284692 | 10/1993 | |
| JP | 7-234162 | 2/1994 | |
| JP | 7-227047 | 8/1995 | |
| JP | 07234162 A | 9/1995 | |
| JP | 8-121293 | 5/1996 | |
| JP | 10-62266 | 8/1996 | |
| JP | 10062266 A | 3/1998 | |
| JP | 10-213492 | 8/1998 | |

* cited by examiner

*Primary Examiner*—Gail Verbitsky
(74) *Attorney, Agent, or Firm*—Oblon, Spivak, McClelland, Maier & Neustadt, P.C.

(57) ABSTRACT

In accordance with the presence or absence of heat, a transistor shows a relatively rapid change, while a cooling water CLW shows a relatively gentle change. The temperatures of both members settle down to approximately equal temperatures when no heat is generated in the transistor. At this time, the temperature of one of the transistor or the cooling water and the amount of energization of the transistor are used to estimate the temperature of the other member. This method is applied to other temperature estimations, such as estimation of the temperature between a stator coil and a stator iron core of a motor etc.

8 Claims, 11 Drawing Sheets

TEMPERATURE VARIATIONS OF
TRANSISTOR AND COOLING WATER

RELATION BETWEEN TEMPERATURE
DEVIATION $\triangle T$ AND CURRENT VALUE

TEMPERATURE VARIATIONS OF STATOR OF THE FIRST MOTOR MG1 AND COOLING WATER

TEMPERATURE VARIATIONS OF STATOR OF
THE SECOND MOTOR MG2 AND COOLING WATER

METHOD OF ESTIMATING TEMPERATURE AND DEVICE FOR THE EFFECTING SAME

INCORPORATION BY REFERENCE

The disclosure of Japanese Patent Application No. 2000-136001 filed on May 9, 2000 including the specification, drawing and abstract is incorporated herein by reference in its entirety.

BACKGROUND OF THE INVENTION

1. Field of the Invention

The invention relates to a technology whereby a temperature of a region in which no temperature sensor is installed is estimated.

2. Description of Background

In measuring temperatures, temperature sensors are commonly used. However, there is a case where it is necessary to check the temperature of a region in which no temperature sensor can be installed directly. Moreover, the probability of the temperature sensor failure is likely to become higher as the number of the sensors increases. Accordingly there are cases where the number of the temperature sensors is desired to be decreased as much as possible. For such cases, it has become the practice to measure a physical value other than the temperature and to estimate the temperature on the basis of a temperature dependence of the physical value. For example, Japanese Patent Laid-Open Publication No. 7-2344162 discloses a technology where a forward current and a forward voltage of an IGBT (insulated gate type bipolar transistor) are measured, and the temperate of the IGBT is estimated from the temperature dependence of the current-voltage characteristics thereof.

Moreover, there are cases where, although the temperature sensor was installed, the temperature at a region in which the temperature sensor was installed is estimated by another means, to detect its malfunctioning. For example, Japanese Patent Laid-Open Publication No. 10-62266 discloses a technology where, in order to detect malfunctioning of a thermistor for measuring a coil temperature of a motor, the coil temperature is estimated by another means. In this technology, a resistance of the coil is obtained from the inductance and the current value of the coil, and the coil temperature is estimated from the temperature dependence of the resistance.

In the temperature estimation technology described above, a specified physical characteristic concerning a region whose temperature is to be estimated is measured and then the temperature is estimated on the basis of the temperature dependence of the physical characteristic. For such a physical characteristic, one that shows a distinct temperature dependence is used.

However, depending on the kind of the region to be estimated, there may be a case where a physical characteristic showing a distinct temperature dependence cannot be measured. Or there may be a case where, although the measurement of such a physical characteristic is feasible, its measurement is not desired because of the need to reduce the number of sensors. Due to various circumstances such as those, there is desired a technology whereby the temperature can be estimated by means other than a method of directly using the temperature dependence of a physical characteristic of the region whose temperature is to be estimated.

SUMMARY OF THE INVENTION

It is an object of the invention to provide the technology whereby the temperature can be estimated by means other than a method of directly using the temperature dependence of a physical characteristic of the region whose temperature is to be estimated.

In an aspect of the invention, a method of estimating a temperature includes the steps of (a) specifying a first object that shows a relatively gentle temperature change; (b) specifying a second object that shows a relatively rapid temperature change in response to the presence or absence of its own heat generation caused by energization, and which is positioned in the vicinity of the first object for exchanging heat therebetween, and which assumes a temperature approximately equal to that of the first object in the absence of heat generation; (c) determining the temperature of one of the first and second objects; and (d) estimating the temperature of the other of the first and second objects on the basis of the temperature determined in the step (c) and a specific value that substantially indicates the amount of the energization. Incidentally, the determination of the temperature of the one object at step (c) may be done with a temperature sensor or by another estimation method.

According to the aforementioned aspect, since the temperature of the other of the first and second objects is estimated on the basis of the temperature of the one object determined by some means, and the specific value that substantially indicates the amount of energization causing the heat generation of the second object, the temperature can be estimated by other means than methods of directly using the temperature dependence of a physical characteristic concerning these objects.

Incidentally, when the temperature of the first object is assumed as T1, the temperature of the second object as T2, and the temperature increment quantity of the second object that is related to the specific value substantially indicating the amount of the energization as ΔT, a relation between the temperature increment quantity ΔT and the specific value substantially indicating the amount of the energization is preliminarily set, and the estimation in the step (d) is executed according to the equation of T2=T1+ΔT.

With this modification, it is possible to determine the temperature increment quantity )T from the specific value that substantially indicates the amount of energization and to easily estimate the temperature of either of the first or second object by using this.

For a combination of the first and second objects, a variety of combinations are considered.

For example, the second object may be a power semiconductor, and the first object may be a coolant for cooling the power semiconductor element. The step (d) includes a process of determining the temperature increment quantity ΔT in accordance with a specific value substantially indicating the amount of energization of the power semiconductor element from the relation between the predetermined temperature increment quantity ΔT and the specific value substantially indicating the amount of energization of the semiconductor element.

Normally, the power semiconductor element has a very small heat capacity and shows a rapid temperature change. Therefore, it is possible to easily estimate the temperature of either the power semiconductor element or the coolant from the specific value that substantially indicates the amount of energization of the power semiconductor element and the coolant temperature.

Or, the first object may be a stator iron core of an electric motor, and the second object may be a stator coil of the electric motor. The step (d) includes a process of determining the temperature increment quantity ΔT in accordance with a specific value substantially indicating the amount of energization of the electric motor from the relation between the predetermined temperature increment quantity ΔT and the specific value substantially indicating the amount of energization of the electric motor.

In this configuration, it is possible that the temperature of either of the stator iron core or the stator coil, and the specific value that substantially indicates the amount of energization of the motor, are used to estimate the temperature of the other.

In this configuration, the step (c) may include a process of determining the temperature of the stator iron core on the basis of the temperature of a coolant for cooling the stator of the electric motor and the specific value substantially indicating the amount of energization of the electric motor.

In this configuration, the temperature of the stator iron core can be determined from the coolant temperature, and further the temperature of the stator coil can be estimated from this.

In another configuration, the second object may be a stator iron core of an electric motor, and the first object is a coolant for cooling the stator of the electric motor. The step (d) may include a process of determining the temperature of the stator iron core on the basis of the coolant temperature and a specific value substantially indicating the amount of energization of the electric motor.

In this configuration, it is possible that the temperature of either of the stator iron core or the coolant and the specific value that substantially indicates the amount of energization of the motor may be used to estimate the temperature of the other.

Or, the second object may be a power semiconductor element, and the first object may be a coolant for cooling the power semiconductor element. The step (c) may include a process of measuring the temperature of the power semiconductor element with a temperature sensor installed on the power semiconductor element, and the step (d) may include a process of determining the temperature of the coolant from the temperature change of the power semiconductor element in a state where the power semiconductor element is not energized.

In the state that there is no energization in the power semiconductor device, the temperature of the power semiconductor device rapidly settles down to a temperature approximately equal to the coolant temperature. Therefore, the coolant temperature can be determined from the temperature change of the power semiconductor element in the state without energization.

Note that the invention can be realized in a variety of forms; for example, it is possible to realize it in a form that comprises: a method and a device for estimating the temperature; a vehicle equipped with the device; a computer program whereby the method or a function of the device is achieved; a recording medium that records the computer program; data signals including the computer program that are realized in a carrier wave, etc.

DETAILED DESCRIPTION OF PREFERRED EMBODIMENTS

Figure 1:
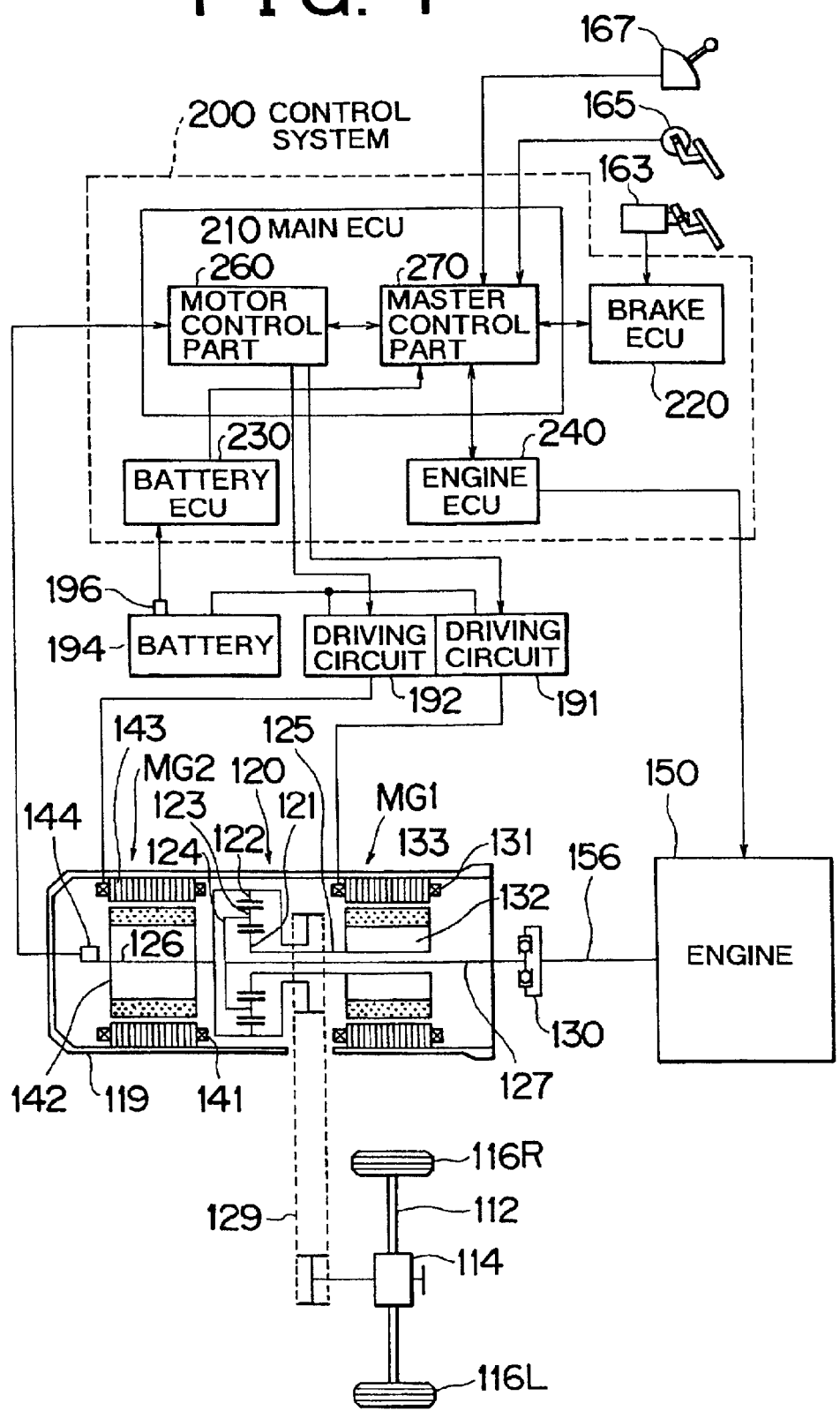
FIG. 1 is an explanatory drawing showing a general configuration of a hybrid vehicle as a first embodiment of the invention.

Next, an embodiment of the invention will be described in the following order.
A. General configuration of a hybrid vehicle
B. Basic operation of hybrid vehicle
C. Temperature estimation of the power transistor
D. Temperature estimation of the first motor MG1
E. Temperature estimation of the second motor MG2
F. Temperature estimation of the cooling water (part 1)
G. Temperature estimation of the cooling water (part 2)
H. Modified examples
A. General configuration of a hybrid vehicle FIG. 1 is an explanatory drawing showing a general configuration of a hybrid vehicle as one embodiment of the invention. This hybrid vehicle is equipped with three prime movers consisting of an engine 150 and two motors/generators MG1, MG2. Here, a "motor/generator" means an electronic motor that can function as a motor and also as a generator. Note that hereinafter each of the engine 150 and the motors/generators MG1, MG2 will be referred to simply as a "motor" for simplicity. The vehicle is controlled by a control system 200.

The control system 200 has a main ECU (Electronic Control Unit) 210, a brake ECU 220, a battery ECU 230, and an engine ECU 240. Each ECU includes a plurality of circuit elements, such as a micro computer, an input interface, and an output interface arranged on a single circuit board as one unit. The main ECU 210 has a motor control part 260 and a master control part 270. The master control part 270 has a function of determining controlled variables such as distribution of the output of the three prime movers 150, MG1, and MG2.

The engine 150 is a normal gasoline engine which rotates a crankshaft 156. Operation of the engine 150 is controlled by the engine ECU 240. The engine ECU 240 executes control of injection quantity of the engine 150 and others in accordance with an instruction from the master control part 270.

Each of the motors MG1, MG2 is configured as a synchronous motor comprising a rotor 132 (142) with a plurality of permanent magnets around its peripheral face, a stator 133 (143) around which three phase coils 131 (141) for forming a rotational magnetic field is wound. The stators 133, 143 are fixed to a case 119. Each of the three-phase coils 131, 141 that is wound around the stator 133 (143) is connected to a second battery 194 via a driving circuit 191 (192), respectively. Each of the driving circuits 191, 192 is a transistor inverter provided with pairs of transistors, each pair being a switching element for each phase. The driving circuits 191,192 are controlled by the motor control part 260. When the transistors of the driving circuit 191 (192) are switched on by a control signal from the motor control part 260, a current flows between the battery 194 and the motor MG1 (MG2). The motors MG1, MG2 can operate as electric motors that rotate to drive other members while receiving electricity from the battery 194 (hereinafter this operation state will be referred to as "power running") and can also function as the electric generators that generate electromotive forces at both ends of the three-phase coils 131, 141 to charge the battery 194 when the rotors 132, 142 are made to rotate by an external force (hereinafter this operation state being referred to "regenerative running").

Rotation axes of the engine 150 and of the motors MG1, MG2 are mechanically linked to one another via a planetary gear 120. The planetary gear 120 is composed of a sun gear 121, a ring gear 122, and a planetary carrier 124 with a planetary pinion gear 123. In the hybrid vehicle of this embodiment, the crankshaft 156 of the engine 150 is linked to a planetary carrier axis 127 via a damper 130. The damper 130 is provided to absorb twist vibrations occurring in the crankshaft 156. The rotor 132 of the motor MG1 is linked to a sun gear axis 125. The rotor 142 of the motor MG2 is linked to a ring gear axis 126. Rotation of the ring gear 122 is transmitted to an axle shaft 112 and wheels 116R, 116L via a chain belt 129 and a differential gear 114.

The control system 200 uses various sensors to achieve the control of the entire vehicle. For example, an accelerator sensor 165 detects the amount of depression of an accelerator pedal by the driver, a shift position sensor 167 detects a position of a gear lever, a brake sensor 163 detects a depressing pressure on a brake pedal, a battery sensor 196 detects a state of charge of the battery 194, a revolution speed sensor 144 measurs the revolution speed (the number of revolutions per unit time) of the motor MG2, etc. Since the ring gear axis 126 and the axle shaft 112 are mechanically linked with the chain belt 129, a ratio of the revolution speeds of the ring gear 126 and of the axle shaft 112 is constant. Accordingly, with the revolution speed sensor 144 installed on the ring gear axis 126, not only the revolution speed of the motor MG2 but also the revolution speed of the axle shaft 112 can be detected.

Figure 2:
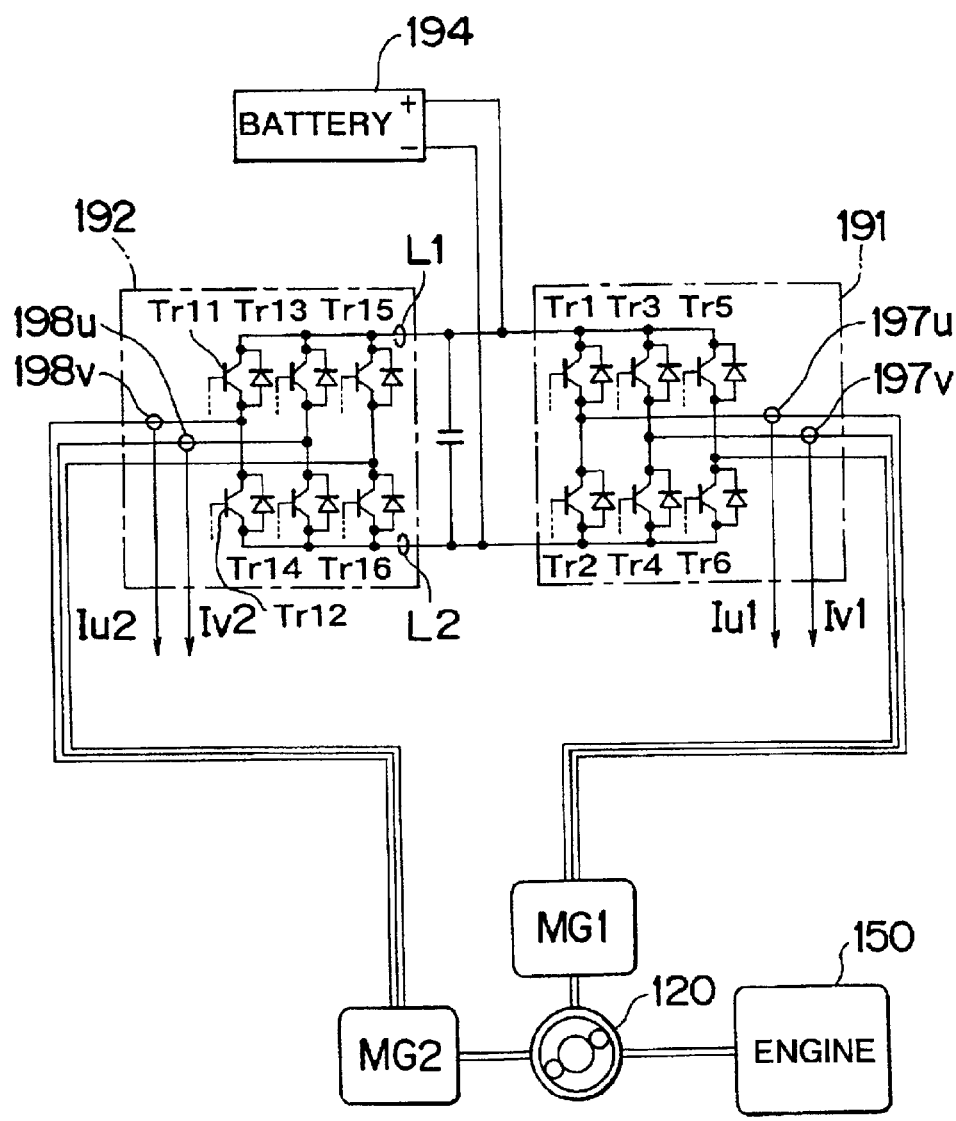
FIG. 2 is an explanatory drawing showing an inner structure of the driving circuit.

FIG. 2 is an explanatory drawing showing an internal configuration of the driving circuits 191, 192. Each of the driving circuits 191, 192 is a three-phase transistor inverter composed of six power transistors Tr1–Tr6 (Tr11–Tr16), respectively. For the transistors Tr1–Tr6 and Tr11–Tr16, for example, various power semiconductor elements such as an IGBT can be used. The first driving circuit 191 has a configuration where the six transistors Tr1–Tr6 therein are arranged in such a way that three sets of transistors, each of which consists of two transistors connected serially, are connected in parallel to power supply lines L1, L2. To each joint point of the three sets of the paired transistor is connected a coil part of the three-phase coil of the first motor MG1. The motor control part 260 (FIG. 1) forms pseudo sinusoidal waves from currents flowing through respective coil parts of the three-phase coil 134 by PMW controlling ratios of turn-on times of the transistors Tr1–Tr6. The second driving circuit 192 is configured in the same way as the first driving circuit 191.

Note that two current sensors 197$u$, 197$v$ for detecting currents Iu1, Iv1 are installed in wires of a U phase and a V phase of three phase output wiring of the first driving circuit 191. Similarly, two current sensors 198$u$, 198$v$ for detecting currents Iu2, Iv2 are installed in wires of a U phase and a V phase of three phase output wiring of the second driving circuit 192. Measured values of these currents are inputted to the motor control part 260 (FIG. 1). Incidentally, since the sum of the current values of the three phases is zero, a current of the W phase is determined from the currents of the U phase and the V phase.

B. Basic operation of the hybrid vehicle

First of all, to explain basic action of the hybrid vehicle, operation of the planetary gear 120 will be described below. The planetary gear 120 has a characteristic that when revolution speeds of the two of the three rotation axes are determined, the revolution speed of the remaining rotation axis is also determined. A relation of the revolution speeds of the rotation axes is as shown in the following equation (1):

$$Nc = Ns \cdot \rho/(1+\rho) + Nr \cdot 1/(1+\rho), \qquad (1)$$

where Nc is the revolution speed of the planetary career axis 127, Ns the revolution speed of the sun gear axis 125, and Nr the revolution speed of the ring gear axis 126. Moreover, $\rho$ is a gear ratio of the sun gear 121 and the ring gear 122, as expressed in the following equation:

$$\rho = [\text{number of teeth of sun gear 121}]/[\text{number of teeth of ring gear 122}].$$

Further, torques of the three rotation axes have fixed relations given by the following equations (2), (3) regardless of the revolution speeds:

$$Ts = Tc \cdot \rho/(1+\rho), \qquad (2)$$

$$Tr = Tc \cdot \rho/(1+\rho) = Ts/\rho, \qquad (3)$$

where Tc is a torque of the planetary carrier axis 127, Ts is a torque of the sun gear axis 125, and Tr is a torque of the ring gear axis 126.

By virtue of a function of such a planetary gear 120, the hybrid vehicle of this embodiment can travel in various states. For example, in a comparatively low speed state when the hybrid vehicle starts travelling, the motor MG2 is made to perform power running while the engine 150 is being stopped and thereby power is transmitted to the axle shaft 112 to propel the vehicle. There may be a case where the vehicle is also made to perform power running while the engine 150 is in an idle state.

When the hybrid vehicle reaches a predetermined speed after starting the travelling, the control system 200 puts the engine 150 in the motoring state with a torque outputted from the motor MG1 for power running and makes it start. At this time, a reaction force torque of the motor MG1 is also outputted to the ring gear 122 via the planetary gear 120.

When the engine 150 is operated and the planetary carrier axis 127 is made to rotate, the sun gear axis 125 and the ring gear axis 126 rotate under a condition that satisfies the foregoing equations (1) to (3). The power by the rotation of the ring gear axis 126 is transmitted, as it is, to the wheels 116R, 116L. The power from the rotation of the sun gear axis 125 can be recovered regeneratively by the first motor MG1 as electric power. On the other hand, if the second motor MG2 is made to perform power running, the power can be outputted to the wheels 116R, 116L via the ring gear axis 126.

When in steady state operation, the output of the engine 150 is set to a value approximately equal to required power of the axle shaft 112 (namely, [revolution speed of the axle shaft 112]×[torque]). At this time, a portion of the output of the engine 150 is transmitted directly to the axle shaft 112 via the ring gear axis 126, and the remaining output is recovered regeneratively by the first motor MG1 as electric power. The electric power so recovered is used to generate a torque with which the second motor MG2 makes the ring gear axis 126 rotate. As a result, the axle shaft 112 can be driven at a desired revolution speed and with a desired torque.

In the case where the torque to be transmitted to the axle shaft 112 is insufficient, the second motor MG2 serves to assist the torque. For electric power required for this assisting, the electric power that is recovered regeneratively by the first motor MG1 and the electric power that has been saved in the battery 149 are used. Thus, the control system 200 controls the operation of the two motors MG1, MG2 in response to the required power that is to be outputted from the axle shaft 112.

The hybrid vehicle of this embodiment can move in reverse while the engine 150 is being operated. When the engine 150 is operated, the planetary career axis 127 rotates in the same direction as that when the vehicle moves forward. At this time, if the sun gear axis 125 is made to rotate at a higher revolution speed than the revolution speed of the planetary carrier axis 127 by controlling the first motor MG1, the ring gear axis 126 rotates in a backward direction, as is apparent from the foregoing equation (1). The control system 200 can make the hybrid vehicle move backward by controlling the input torque of the second motor MG2 while the second motor MG2 is made to be rotating in a backward direction.

The planetary gear 120 can make the planetary carrier 124 and the sun gear 121 rotate while the ring gear 122 is stopped. Therefore, even when the vehicle is stopped, the engine 150 can be operated. For example, when a remaining capacity of the battery 194 decreases, the battery 194 can be charged by operating the engine 150 and also making the first motor MG1 perform regenerative operation. If the first motor MG1 is made to do the power running when the vehicle is stopped, the engine 150 can be put into the motoring state by its torque and be started.

C. Temperature estimation of power transistors

Figure 3:
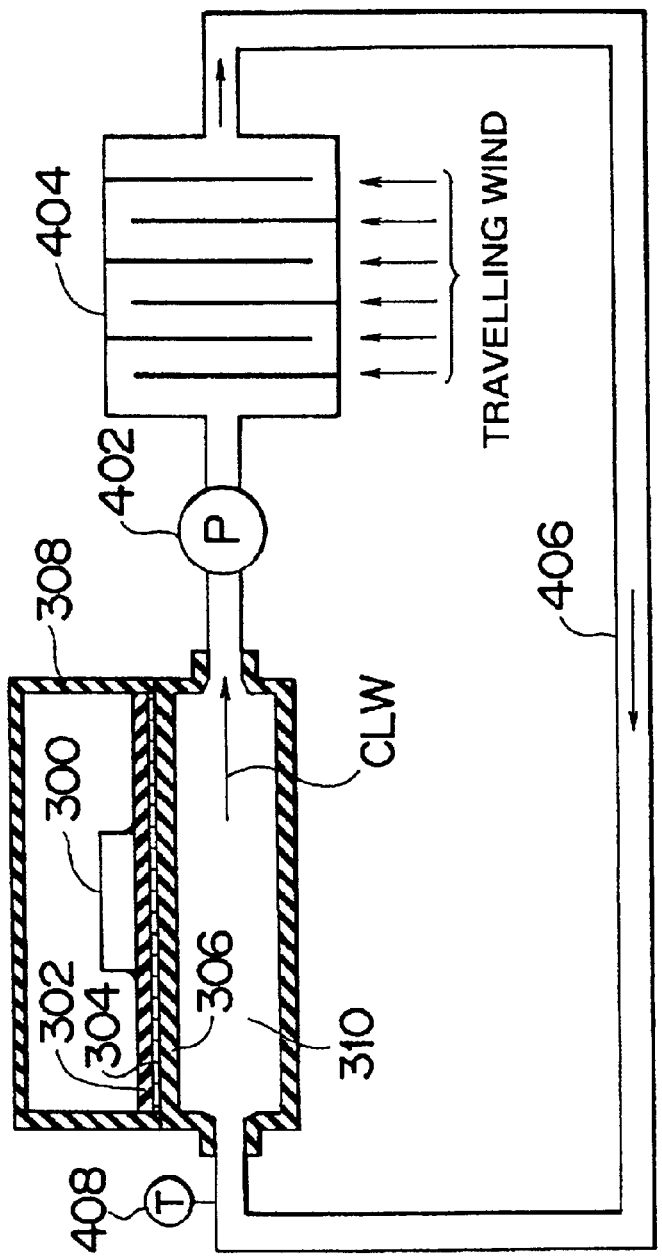
FIG. 3 is an explanatory drawing showing the configuration of a cooling system for cooling the transistor of the driving circuit.

FIG. 3 is an explanatory drawing showing a configuration of a cooling system for cooling power transistors of the driving circuits 191, 192. Twelve transistors 300 that constitute the driving circuits 191, 192 (Tr1–Tr6 and Tr11–Tr16 of FIG. 2) are soldered on a substrate 302. Incidentally, in FIG. 3, only one transistor is drawn for convenience. The substrate 302 is fixed on a cooling plate 306 made of aluminum by solder 304. This solder 304 is for increasing thermal conductivity between the substrate and the cooling plate 306. A space above the transistor 300 is covered with a lid 308 made of aluminum. Moreover, a cooling passage 310 is formed inside the cooling plate 306 just below the transistor 300.

Cooling water CLW for cooling the transistor 300 passes through the cooling passage 310 inside the cooling plate 306, then being pressurized by a pump 402 and cooled by a radiator 404, and subsequently returns to the cooling passage 310 again via a circulating passage 406. In a channel upstream of where the cooling plate 306 is installed is a temperature sensor 408 for measuring temperature of the cooling water CLW. Note that the radiator 404 is provided independently from a radiator for the engine.

All of the substrate 302, the solder 304, and the cooling plate 306 are made of materials having excellent thermal conductivity. Therefore, the heat generated by the transistor 300 is rapidly conducted to the cooling water CLW via these members.

Incidentally, the first motor MG1 is mainly used as a generator as described above, while the second motor MG2 is used mainly as a motor. As a result, normally the second motor MG2 has a larger current value. Since, in general, the larger the current value of a transistor is, the larger the heat generation thereof becomes, the transistors Tr11–Tr16 (FIG. 2) for the second motor MG2 show a tendency of reaching a higher temperature than the transistors Tr1–Tr6 for the first motor MG1. Then, in this embodiment, the V-phase transistors Tr13, Tr14 arranged in the center among the six transistors, and have a tendency of reaching the highest temperature, are chosen as the objects whose temperature is to be estimated.

Figure 4:
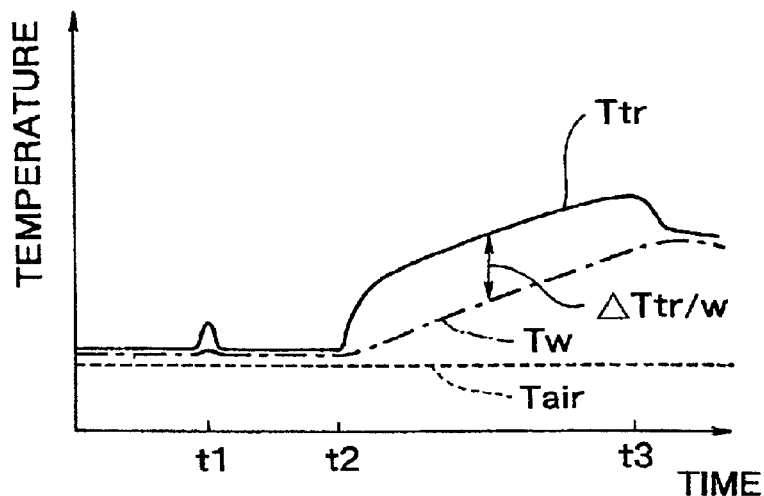
FIG. 4 is a graph showing one example of variations of a transistor temperature and of a cooling water temperature.

FIG. 4 is a graph showing one example of variations of the temperatures of the transistor and of the cooling water. When the transistor 300 is not operated, the transistor 300 does not generate the heat, and consequently the transistor temperature Ttr and the temperature of the water Tw are kept constant and approximately equal. Moreover, the temperature of the airflow Tair that cools the radiator 404 is kept at a constant value slightly lower than these temperatures.

When the transistor 300 is briefly turned on at time t1, the transistor temperature Ttr increases slightly due to the heat generation. However, since the heat capacity of the transistor 300 is very small compared to the heat capacities of the cooling plate 306 etc., and the heat is rapidly conducted to the cooling water CLW, and the transistor temperature Ttr drops to approximately the same value as the cooling water temperature Tw.

From time t2 to time t3, the transistor 300 is continuously turned on at a constant output. In this case, since the calorific value is large, the transistor temperature Ttr gradually rises and, in accordance therewith, cooling water temperature Tw also rises. Then, when the operation of the transistor 300 stops at time t3, the transistor temperature Ttr drops rapidly (in a few or few tens of seconds) down to the same temperature as the cooling water temperature Tw. Incidentally, it is assumed that the airflow temperature Tair is constant.

Thus, the transistor temperature Ttr rises higher than the cooling water temperature during the operation of the transistor 300 and when the operation is stopped, it drops down to approximately the same temperature as the cooling water temperature Tw. Moreover, during the operation of the transistor 30, a difference $\Delta Ttr/w$ between the transistor temperature Ttr and the cooling water temperature Tw is kept almost constant.

The transistor temperature $Ttr(i)$ at an arbitrary time i can be expressed by the following equation (4):

$$Ttr(i) = Ttr(i-1) + K11 \cdot PLtr(i) - K12[Tt(i-1) - Tw(i-1)], \quad (4)$$

where $PLtr(i)$ is the calorific value of all the transistors (power loss) from time (i−1) to time i, and K11 and K12 are predetermined coefficients, respectively.

The first term on the right side of the equation (4) is the transistor temperature at time (i−1). The second term on the right side represents the temperature increment quantity due to the heat generation of the transistors and the third term on the right side represents a temperature decrement quantity due to thermal conduction thereof to the cooling water CLW. Incidentally, the second and third terms on the right side are the amounts of temperature change per unit time. Here, "unit time" means a period of time from time (i−1) to time i.

Strictly speaking, one should consider other elements such as a temperature decrease due to thermal radiation from the transistor 300 and a temperature decrease due to the thermal conduction to the substrate 302 in the foregoing equation (4). However, it turns out that contributions from these other components are sufficiently small and can be disregarded.

Incidentally, it turns out that the second term on the right side of the foregoing equation (4) is kept at a constant value so long as the transistor is operated at a constant output. In other words, the second term on the right side is given as a function of the output of the transistor. Moreover, as can be understood from the example of FIG. 4, as long as the output of the transistor is constant, the difference ΔTtr/w between the transistor temperature Ttr and the cooling water temperature Tw is almost constant. This means that the third term on the right side of the equation (4) is an almost constant value. Therefore, the third term on the right side is also given as a function of the output of the transistor. That is, the second term and the third term on the right side are both found to be functions of the output of the transistor. Considering these facts, the foregoing equation (4) can be rewritten as the following equation (5):

$$Ttr(i)=Ttr(i-1)+\Delta Ttr(Ptr), \quad (5)$$

where ΔTtr(Ptr) is a variation of the transistor temperature per unit time when the output of the transistor is Ptr.

The variation of the transistor temperature ΔTtr(Ptr) corresponds to an increasing rate of temperature when the transistor temperature Ttr increases almost linearly at a period after time t2 in FIG. 4.

Incidentally, the transistor temperature Ttr(i−1) at time (i−1) is expressed by the sum of the cooling water temperature Tw(i−1) and the transistor/cooling water temperature difference ΔTtr/w.

Therefore, the foregoing equation (5) type can be rewritten as the following equation (6):

$$Ttr(i)=Tw(i-1)+\Delta Ttr/W(Ptr)+\Delta Ttr(Ptr), \quad (6)$$

Combining the second term and the third term on the right side into one term, the following equation (7) is obtained:

$$Ttr(i)=Tw(i-1)+\Delta T(Ptr), \quad (7)$$

where $$\Delta Ttr/w(Ptr)+\Delta T(Ptr)=\Delta Ttr(Ptr).$$

That is, the transistor temperature Ttr(i) at time i when the output of the transistor is Ptr is given by summation of the cooling water temperature Tw(i−1) at time (i−1) and the temperature deviation ΔT(Ptr) that depends on the output of the transistor.

Here, the third term on the right side of the equation (6) is the increasing rate of the transistor temperature and is approximately equal to an increasing rate of the cooling water temperature, which can be understood from FIG. 4. Therefore, the sum of the first term and the third term on the right side of equation (6) is approximately equal to the water temperature Tw(i) at time i. Then, it is also possible to rewrite the foregoing equation (6) as the following equation (8):

$$Ttr(i)=Tw(i)+\Delta T'(Ptr), \quad (8)$$

where $$\Delta T'(Ptr)=\Delta Ttr/w(Ptr).$$

The cooling water temperature Tw(i−1), Tw(i) is measured by the temperature sensor 408 (FIG. 3) installed in the circulating passage 406. Moreover, the temperature deviations ΔT(Ptr), ΔT'(Ptr) are determined, for example, by a map for indicating a value of the temperature deviation in accordance with current values of the motors MG1, MG2 and a three-phase alternating current frequency. This map is made experimentally beforehand. Note that since the first motor MG1 is mainly used as the generator, the current value thereof is comparatively small, and hence the heat generation by the transistors for the first motor MG1 can be disregarded. Therefore, in this embodiment, the temperature deviations ΔT(Ptr), ΔT'(Ptr) are determined on the basis of the current values and the three-phase alternating current frequency of the second motor MG2 used mainly as the motor.

Figure 5:
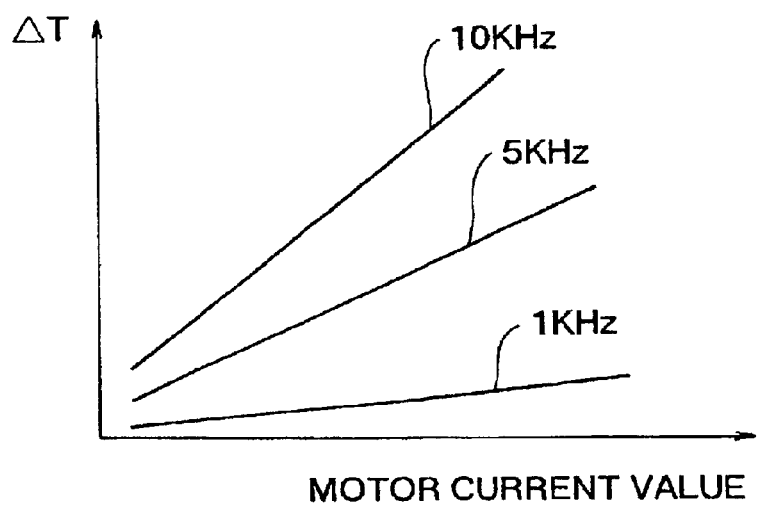
FIG. 5 is a graph showing one example of a map of a temperature deviation $\Delta T(Ptr)$ to be used when the transistor temperature is obtained.

FIG. 5 shows one example of the map of the temperature deviation ΔT(Ptr). In this map, the relation between the current value of the motor and the temperature deviation ΔT of the transistor is shown for different values of the three-phase alternating current frequency.

Thus, the transistor temperature Ttr can easily be estimated as the sum of the measured value of the cooling water temperature Tw and the temperature deviation ΔT that depends on the output Ptr of the transistor. Therefore, the transistor temperature can be estimated without directly using the temperature dependence of a physical characteristic of the transistor such as the temperature dependence of the current value of the transistor.

The temperature deviations ΔT, ΔT' may be determined on the basis of another specific value that substantially indicates the mount of energization of the transistor, and is not limited to a combination of the current value and the three-phase alternating current frequency. For example, the temperature deviations ΔT, ΔT' may be determined on the basis of a torque instruction value that is given to the motor control part 260 from the master control part 270 and a carrier frequency of a driving signal (frequency of a driving signal pulse in PWM control) that is given to the driving circuits 191, 192 from the motor control part 260.

Incidentally, the calorific value of the transistor depends also on whether the current supplied to the motor is a sinusoidal wave or a rectangular wave. Therefore, different maps of the temperature deviations ΔT, ΔT' for each waveform may be prepared.

D. Temperature estimation of the first motor MG1

Figure 6:
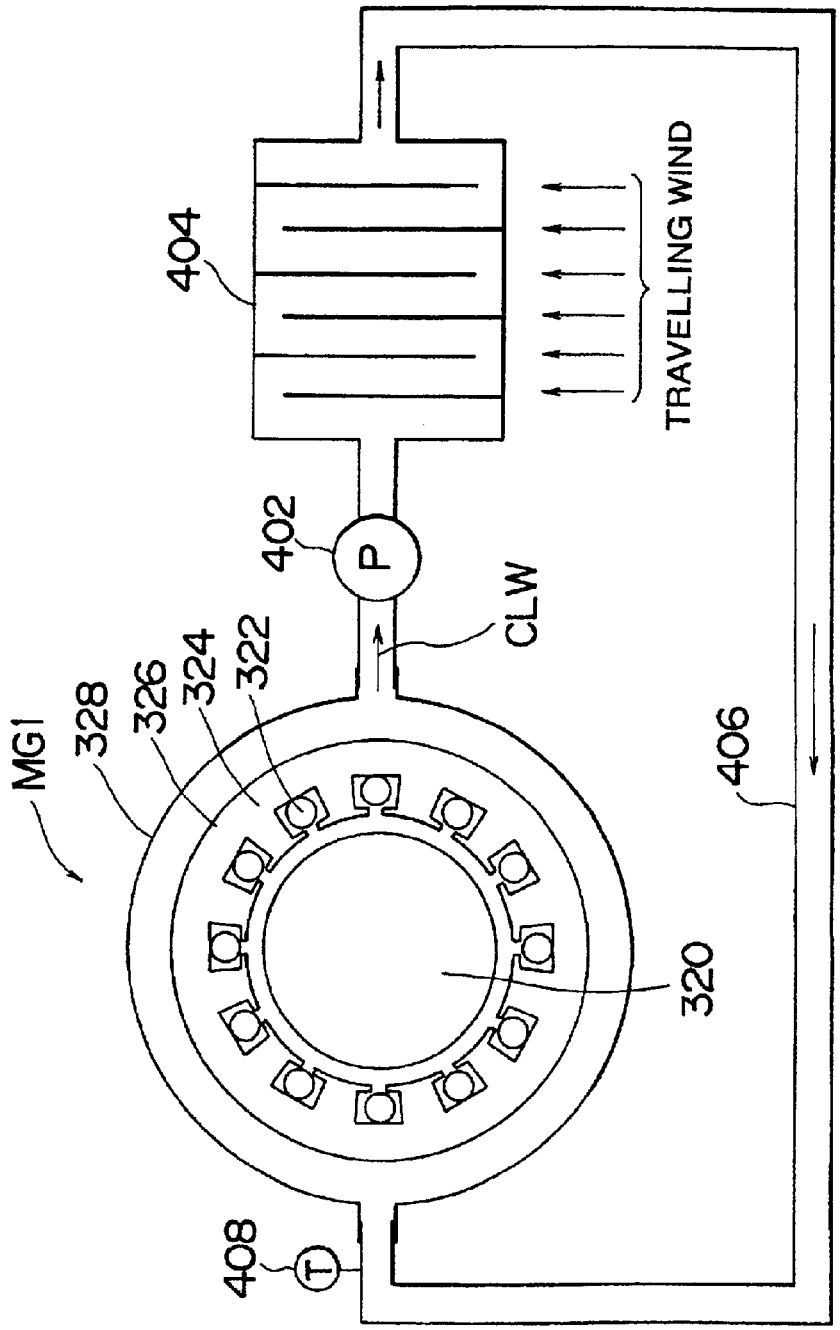
FIG. 6 is an explanatory drawing showing the configuration of the cooling system for cooling the first motor.

FIG. 6 is an explanatory drawing showing the configuration of the cooling system for cooling the first motor MG1. The first motor MG1 has a rotor 320, a stator coil 322, and stator iron core 324, all of which are housed in a motor case 326. A periphery of the motor case 326 is enclosed with a jacket 328 and the passage of the cooling water CLW is formed between these members.

The configuration of the cooling system of FIG. 6 is approximately the same as the cooling system for the transistor shown in FIG. 3. Incidentally, the cooling system for the transistor and that for the motor may be constructed as a single system for common use, but here description will be made assuming that these are independent from each other.

As factors of the heat generation in the first motor MG1, there are enumerated copper loss (loss in the coil 322) and iron loss (loss in the iron core 324). Since the first motor MG1 is mainly used as the generator and the current density is comparatively small, the copper loss is small and can be disregarded. Therefore, all that should be considered as a heating factor in the first motor MG1 is the iron loss, and hence a member whose temperature rises highest is the stator iron core 324.

Figure 7:
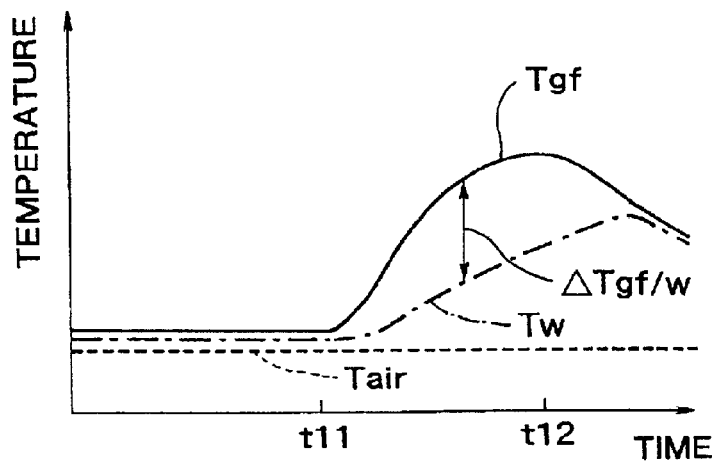
FIG. 7 is a graph showing one example of variations of the iron core temperature of the first motor and of the cooling water temperature.

FIG. 7 is a graph showing one example of variations of the iron core temperature and the cooling water temperature of the first motor MG1. When the motor MG1 is not being operated, there is no heat generation in the iron core, and hence the iron core temperature Tgf and the water temperature TW are kept constant and at approximately the same temperature.

From time t11 to time t12, the motor MG1 is continuously operated at a constant output. At this time, the iron core temperature Tgf rises gradually and the cooling water temperature Tw also rises. Then, when the supply of the electric power to the motor MG1 is stopped at time t12, the iron core temperature Tgf slowly approaches the cooling water temperature Tw, and finally both temperatures fall to approximately the same temperature.

Thus, the iron core temperature Ttr of the first motor MG1 has a characteristic that when the MG1 is supplied with the electric power, it is higher than the cooling water temperature Tw, but once the supply of the electric power is stopped, it slowly drps down to approximately the same temperature as the cooling water temperature.

The iron core temperature Tgf(i) at an arbitrary time i can be expressed by the following equation (9):

$$Tgf(i)=Tgf(i-1)+K21 \cdot PLgf(i)-K22[Tgf(i-1)-Tw(i-1)], \quad (9)$$

where PLgf(i) is a calorific value of the iron core from time (i-1) to time i, and K21 and K22 are predetermined coefficients, respectively.

The second term on the right side of the equation (9) represents the temperature increment quantity due to the heat generation and the third term on the right side represents the temperature decrement quantity due to cooling.

As can be understood when comparing FIG. 7 and FIG. 4, the variation of the iron core temperature is comparatively slow and the temperature deviation $\Delta Tgf/w$ between the iron core temperature Tgf and the cooling water temperature Tw also varies slowly with time. The reason for this is that the iron core 324 has a large heat capacity.

The iron core temperature Tgf of the first motor MG1 is determined by using the equation (9). Unknown numbers on the right side of the equation (9) are the water temperature Tw(i-1) and the calorific value of the iron core PLgf. The water temperature Tw(i-1) is measured by the temperature sensor 408 installed in the circulating passage 406. Moreover, the calorific value PLgf is determined from a map that has been made beforehand in such a way that each piece of data therein corresponds to a value that substantially indicates the output of the motor, such as the torque and the revolution speed of the motor. This map is similar to that of FIG. 5 described above and its illustration is omitted here.

Incidentally, an initial value of the iron core temperature Tgf is determined by measuring the water temperature Tw when the motor MG1 has not been supplied with electric power for a sufficiently long time and then adding a predetermined temperature deviation $\Delta T0w$ to this water temperature Tw. This temperature deviation $\Delta T0w$ is obtained experimentally beforehand for different levels of the water temperature Tw. Alternatively, it may be possible to store the water temperature Tw and the iron core temperature Tgf when the energization is stopped and to estimate the temperature deviation $\Delta T0w$ by using the equation (9) in accordance with an idle time of zero torque.

As mentioned above, the iron core temperature Tgf of the first motor MG1 can be estimated on the basis of the cooling water temperature Tw and the calorific value PLgf(i) that depends on the output of the motor MG1 (or the amount of energization of the motor). The iron core temperature can be estimated without directly using the temperature dependence of a physical characteristic of the motor.

E. Temperature estimation of the second motor MG2

Figure 8:
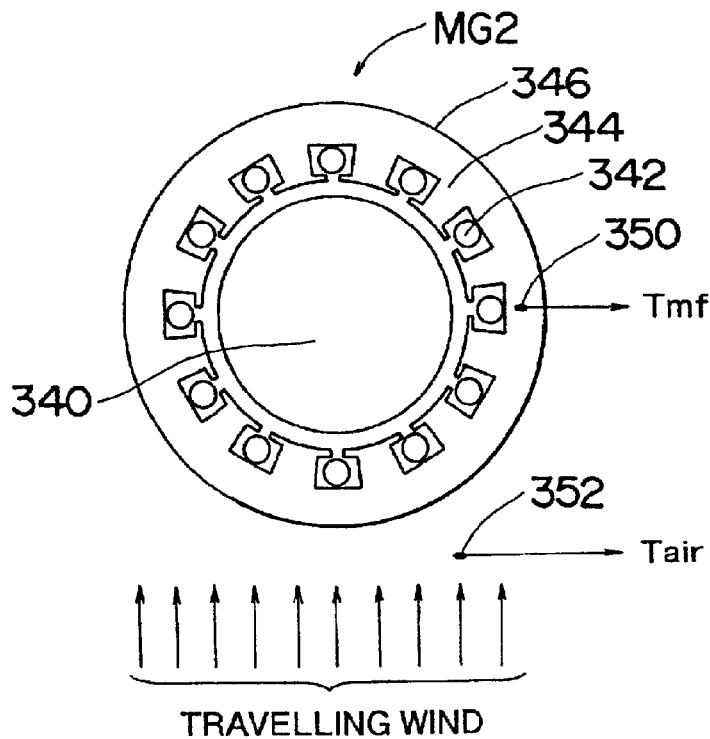
FIG. 8 is an explanatory drawing showing the method of cooling the second motor.

FIG. 8 is an explanatory drawing showing a method of cooling the second motor MG2.

The second motor MG2 has a rotor 340, a stator coil 342, and a stator iron core 344, all of which are housed in a motor case 346. The motor case 326 is cooled by airflow. Incidentally, the iron core 344 is provided with a temperature sensor 350. Moreover, in front of the motor MG2 installed is a temperature sensor 352 for measuring the outside ambient temperature. The second motor MG2 is used mainly as a motor, and since the electric current density is comparatively large, the copper loss cannot be disregarded. Then, both the copper loss and the iron loss are considered as heating factors in the second motor MG2. Incidentally, it is in the stator coil 342 that the temperature rises highest.

Figure 9:
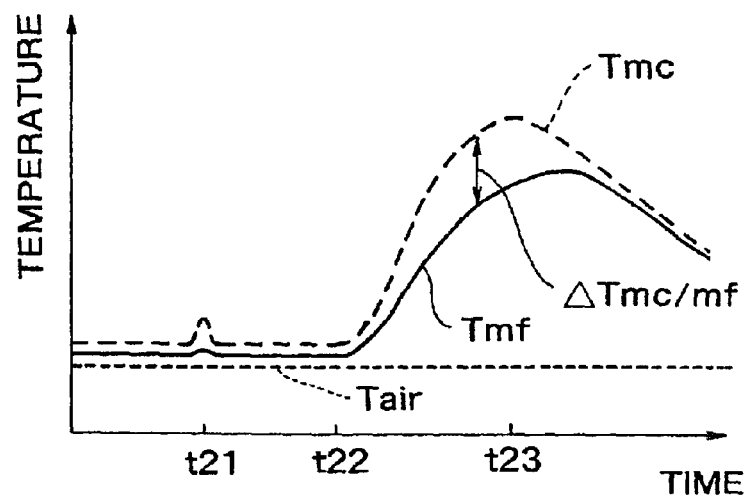
FIG. 9 is a graph showing one example of variations of the coil temperature of the second motor and of the iron core temperature.

FIG. 9 is a graph showing an example of variations of the coil temperature Tmc of the second motor MG2 and of the iron core temperature Tmf. When the motor MG2 is not operated, there is no heat generation and hence temperatures Tmc, Tmf are kept constant and at approximately the same.

When the motor MG2 is supplied with electric power at time t21, the coil temperature Tmc also increases slightly due to heat generation, and in accordance with this the iron core temperature Tmf also increases a little. However, since the heat capacity of the coil 342 is very small compared to the heat capacity of the iron core 344 and the thermal conductivity between the two members is high, the coil temperature Tmc drops down to approximately the same value as the iron core temperature Tmf in a comparatively short time.

From time t22 to time t23, the motor MG2 is continuously operated at a constant output. At this time, the coil temperature Tmc and the iron core temperature Tmf rise gradually. Then, when the supply of the electric power to motor MG2 is stopped at time t23, the coil temperature Tmc approaches the iron core temperature Tmf in a comparatively short time. Further, the iron core temperature slowly approaches the outside ambient temperature Tair and finally drps down to approximately the same temperature as the outside ambient temperature Tair.

In this way, the coil temperature Tmc of the second motor MG2 varies in a comparatively rapid manner, while the iron core temperature Tmf varies in a comparatively slow manner. Moreover, the coil temperature Tmc has a characteristic that when the motor MG1 is supplied with electric power, the coil temperature Tmc rises higher than the iron core temperature Tmf, but when the supply of the electric power is stopped, the coil temperature drops down to approximately the same temperature as the iron core temperature Tmf.

The coil temperature Tmc(i) at an arbitrary time i can be expressed by the following equations (10):

$$Tmc(i)=Tmc(i-1)+K31 \cdot PLm(i)-K32[Tmc(i-1)-Tmf(i-1)], \quad (10)$$

where PLm(i) is the calorific value of the motor MG2 from time (i−1) to time i, and K31 and K32 are predetermined coefficients, respectively.

Note that a proportion of the heat generated in the coil 342 of the heat generation by the motor MG2 is considered in the term of the calorific value of the motor, K31·PLm(i). That is, the second term on the right side of the equation (10) represents the temperature increment quantity due to the heat generation of the coil 342. Moreover, the third term on the right side represents the temperature decrement quantity due to the thermal conduction from the coil 342 to the iron core 344.

The relation between the coil temperature Tmc and the iron core temperature Tmf in FIG. 9 is similar to the relation between the transistor temperature Ttr and the cooling water temperature Tw shown in FIG. 4. Then, in this embodiment, as an equation that gives the coil temperature Tmc, the following equation (11) that is analogous to the foregoing equation (7) is used instead of the equation (10):

$$Tmc(i)=Tmf(i-1)+\Delta T(Pm), \quad (11)$$

where Pm is an output of the motor MG2.

That is, the coil temperature Tmc(i) at time i when the motor MG2 is being operated at output Pm is given by the summation of the iron core temperature Tmf(i−1) at time (i−1) and the temperature deviation ΔT(Pm) in accordance with the output of the motor MG2.

Alternatively, it is also possible to use the following equation (12) that is analogous to the foregoing equation (8) instead of the equation (11):

$$Tmc(i)=Tmf(i)+\Delta T'(Pm), \quad (12).$$

The iron core temperatures Tmf(i−1), Tmf(i) are measured by the temperature sensor 350 (FIG. 8) installed in the iron core 344. Moreover, the temperature deviations ΔT(Pm), ΔT' (Pm) are determined from a map that indicates the temperature deviations, each of which corresponds to a value (or values) that substantially indicates the output of the motor, such as the torque and the revolution speed of the motor. This map is similar to FIG. 5 described above and its illustration is omitted here.

Thus, if the iron core temperature Tmf can be measured, the iron core temperature Tmc can easily be estimated as the sum of the measured value of the iron core temperature and the temperature deviation ΔT that depends on the output of the motor MG2. Therefore, the coil temperature can be estimated without directly using the temperature dependence of a physical characteristic of the coil, like the temperature dependence of the coil resistance.

Incidentally, if the iron core temperature Tm of the first term on the right side of the foregoing equation (11) or (12) cannot be measured, it is possible to estimate the iron core temperature Tmf from the outside ambient temperature Tair. At this time, the iron core temperature Tmf(i) at an arbitrary time i can be expressed by the following equation (13):

$$Tmf(i)=Tmf(i-1)+K41 \cdot PLm(i)-K42[Tm(i-1)-Tair(i-1)], \quad (13)$$

where K41 and K42 are predetermined coefficients, respectively.

Note that the heat conducted from the coil 342 to the iron core 344 is considered in the term of the calorific value of the motor, K41·PLm(i). The outside ambient temperature Tair(i−1) included in the third term on the right side is measured by the temperature sensor 352 (FIG. 8) installed on the upstream side of the motor MG2. Incidentally, the influence of the velocity of the cooling airflow on the cooling by the can be disregarded and is not considered in the third term on the right side.

The initial value of the iron core temperature Tmf in the foregoing equation (13) is determined by adding a predetermined temperature deviation ΔT0air to the outside ambient temperature Tair measured when the motor MG1 is not supplied with electric power for a sufficiently long period. This temperature deviation T0air is obtained experimentally beforehand for each of various levels of the outside ambient temperature Tair.

As mentioned above, the iron core temperature Tmf of the second motor MG2 can be estimated on the basis of the temperature Tair of the outside air that serves as a coolant and the calorific value PLm(i) that depends on the output of the motor MG2 (or the amount of energization of the motor). The iron core temperature can be estimated without directly using the temperature dependence of a physical characteristic of the motor.

Further, by using the iron core temperature Tmf thus estimated, the coil temperature Tmc can also be estimated with the foregoing equation (11) or (12).

F. Temperature estimation of the cooling water (part 1)

Figure 10:
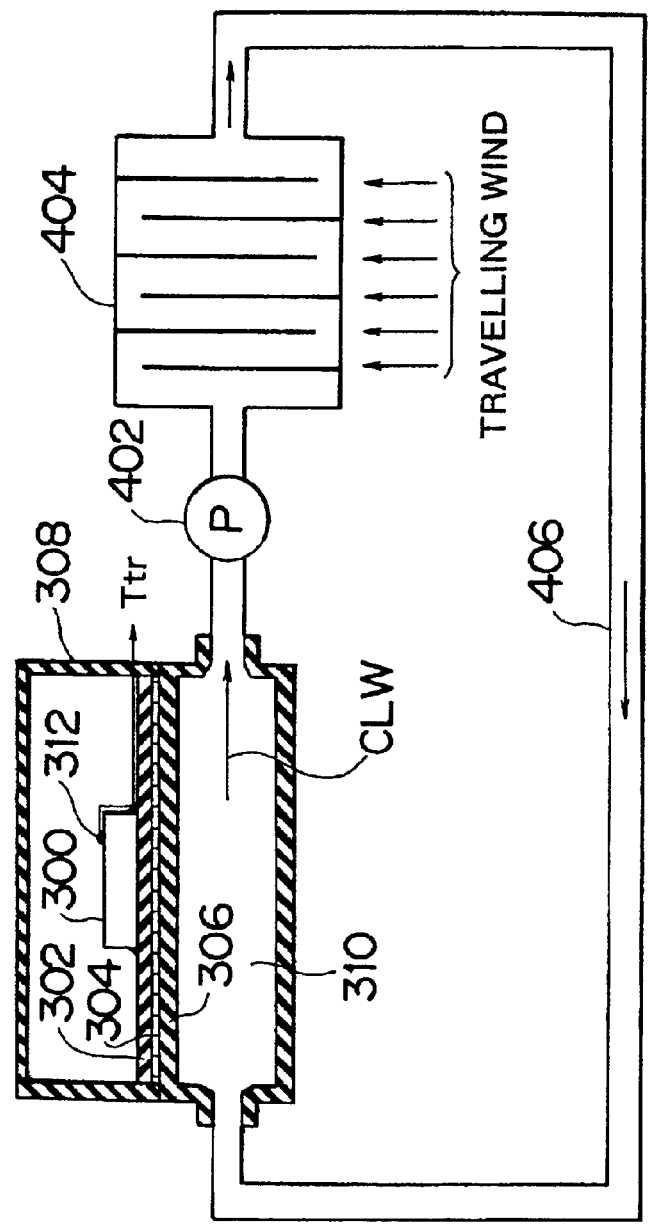
FIG. 10 is an explanatory drawing showing another configuration of a cooling system for cooling the power transistors.

FIG. 10 is an explanatory drawing showing another configuration of a cooling system for cooling the power transistors. A difference of this configuration from the one shown in FIG. 3 is the use of a temperature sensor 312 for measuring the temperature Ttr of the transistor 300 instead of the temperature sensor 408 for the cooling water. With such a configuration, the cooling water temperature Tw can be estimated from the measured value of the transistor temperature Ttr.

The cooling water temperature Tw(i) at an arbitrary time i can be expressed by the following equations (14)

$$Tw(i)=Tw(i-1)+K51[Ttr(i-1)-Tw(i-1)]-K52[Tw(i-1)-Tair(i-1)] \quad (14)$$

where K51 and K52 are predetermined coefficients, respectively.

The second term on the right side of the equation (14) represents the temperature increment quantity due to the thermal conduction from the transistor, and third term on the right side represents the temperature decrement quantity due to the cooling with the radiator 404.

When the cooling water temperature Tw is estimated by using this equation (14), normally the outside ambient temperature Tair is measured with the temperature sensor. However, it is also possible to estimate the cooling water temperature Tw by the equation (14) using the outside ambient temperature Tair estimated by other methods, as will be described later.

Incidentally, instead of the above-described equation (14), it is possible to use the following equation (15) that is obtained by modifying the above-described equation (8):

$$Tw(i)=Ttr(i)-\Delta T'(Ptr), \quad (15)$$

where ΔT' (Ptr) is the temperature deviation that depends on the output Ptr of the transistor.

That is, the cooling water temperature Tw(i) can be estimated as a difference of the measured value of the transistor temperature Ttr and the temperature deviation ΔT that depends on the output Ptr of the transistor.

Figure 11:
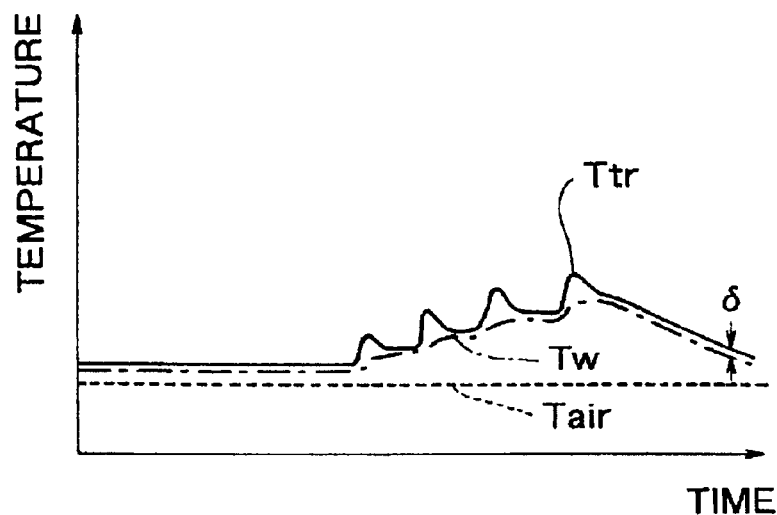
FIG. 11 is a graph showing variations of the transistor temperature Ttr and the cooling water temperature TW when the transistor is subject to operating and stopped states that are repeated alternately.

When the output of the transistor is zero, the second term on the right side of the equation (15) is also zero. Therefore, when the operating state and the stopped state of the transistor are alternately repeated, the transistor temperature Ttr and the cooling water temperature Tw exhibit variations, for example, as shown in FIG. 11. That is, the water temperature Ttr when the output of the transistor is zero is approximately equal to the cooling water temperature Tw.

Considering such a phenomenon, the cooling water temperature Tw when the output of the transistor is zero can be estimated by using the following equation (16):

$$Tw(i)=Ttr(i)-\delta, \quad (16)$$

where Ttr(i) is a measured value of the transistor temperature and δ denotes a predetermined temperature difference.

This temperature difference δ is a value to be determined experimentally, but may be assumed as δ=0.

In various methods of estimating a temperature, using the temperature of one of the first object (e.g., the cooling water or the stator iron core) that shows a comparatively small temperature change and the second object (e.g., the transistor or the stator coil) that shows a comparatively rapid temperature change, the temperature of the other is estimated. As the second object, selected is an object having a property such that it generates heat arising from its energization and whose temperature drops down to a temperature approximately equal to that of the first object when the heat generation is absent. Moreover, the first and second objects are positioned in mutual vicinity and in conductive heat exchange. Here, a relation that "the first and second object are positioned in mutual vicinity" does not require that both members should be in direct contact with each other, but only requires that both members should be at such positions that substantial heat exchange occurs.

G. Temperature estimation of cooling water (part 2)

Figure 12:
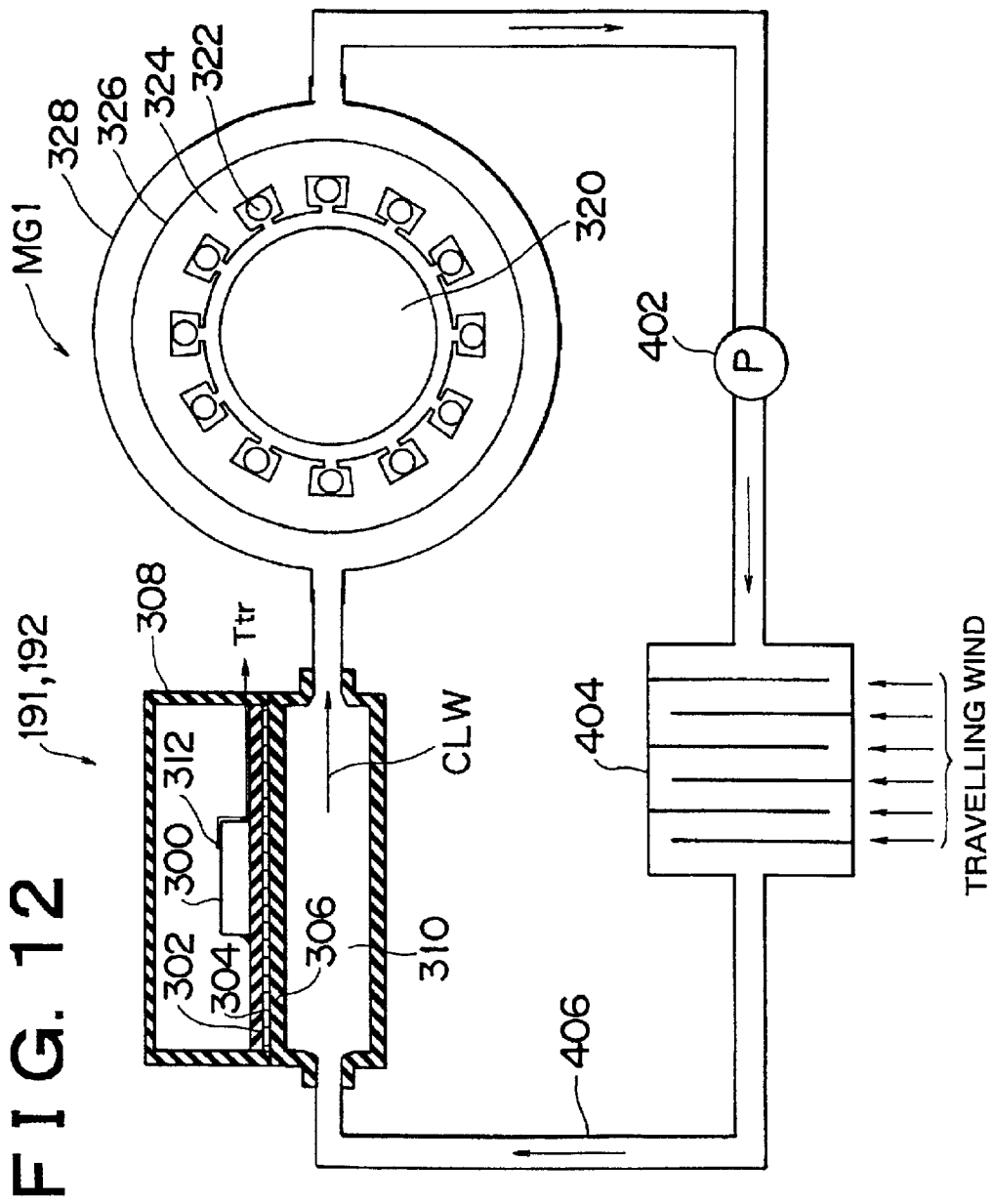
FIG. 12 is an explanatory drawing showing the configuration of a common cooling system for cooling the power transistor and the first motor.

FIG. 12 is an explanatory drawing showing the configuration of a common cooling system for cooling the power transistors and the first motor MG1. This cooling system is different from the system shown in FIG. 10 only in the respect that a cooling passage for the first motor MG1 is inserted between the driving circuits 191, 192 and the pump 402 and the configuration is otherwise the same as the system shown in FIG. 10. Also with such a configuration, the cooling water temperature Tw can be estimated from the measured value of the transistor temperature Ttr.

The cooling water temperature Tw(i) at an arbitrary time i can be expressed by the following equation (17):

$$Tw(i)=Tw(i1)+K61\cdot PLg(i)+K62 \cdot PLm(i)-K63[Tw(i1)-Tair(i1)], \quad (17)$$

where K61, K62, and K63 are predetermined coefficients, respectively.

A second term on the right side in the equation (17) represents the sum of the temperature increment quantity due to the iron loss of the first motor MG1 and the temperature increment quantity due to the heat generation of the transistor 300 for driving the first motor MG1. A third term on the right side represents the temperature increment quantity due to the heat generation of the transistor 300 for driving the second motor MG2. Moreover, a fourth term on the right side represents the temperature decrement quantity due to cooling.

The second term on the right side of the equation (17) is determined from a map that has been made beforehand in such a way that each piece of data therein corresponds to the value(s) that substantially indicates the amount of energization of the first motor MG1 (the current value and the three-phase alternating current frequency, or the torque and the carrier frequency). Moreover, the third term on the right side is determined similarly from a map that has been made beforehand in such a way that each piece of data therein corresponds to the value that substantially indicates the amount of energization of the second motor MG2. Note that parameters in these maps may be partly simplified. For example, since the carrier frequency of the torque and the carrier frequency have a comparatively small influence, a map in which only the torque is chosen for a parameter may be used instead.

If the outside ambient temperature Tair of the fourth term on the right side of the equation (17) is measured by the temperature sensor, the water temperature Tw at an arbitrary time i can be estimated. However, in this embodiment, both the cooling water temperature Tw and the outside ambient temperature Tw are estimated using the temperature sensor 312 installed on the transistor 300 in the following manner, without using the temperature sensor for the outside ambient temperature Tair.

Figure 13:
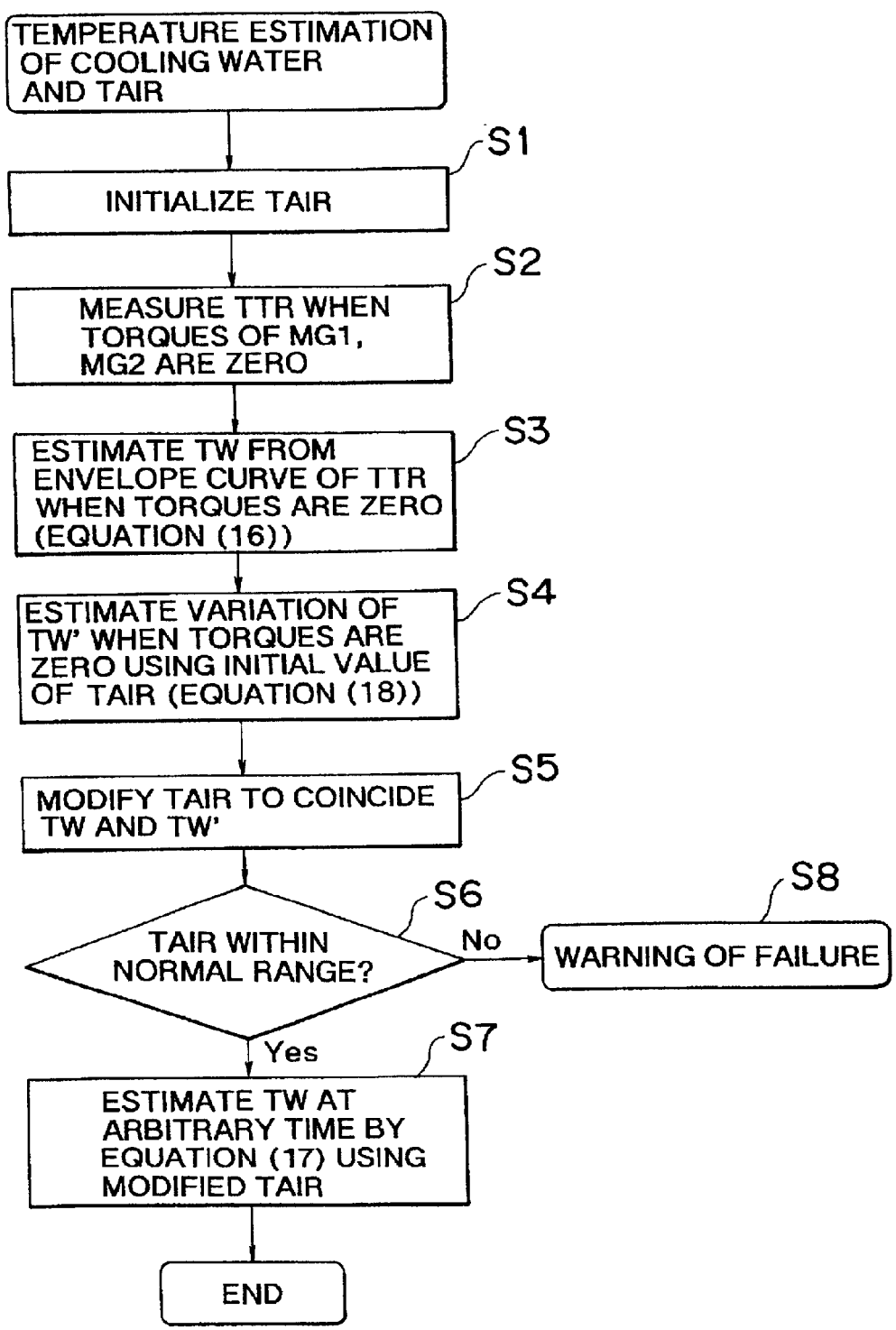
FIG. 13 is a flowchart representing the procedure by which the cooling water temperature and the outside ambient temperature are estimated.

FIG. 13 is a flowchart representing the procedure by which the cooling water temperature and the outside ambient temperature are estimated. This processing is achieved by a CPU that is in the master control part 270 (not shown in the figures) executing a predetermined program.

At step S1, an initial value is set for the outside ambient temperature Tair. For this initial value, an arbitrary temperature (e.g., 10EC) is used. At step S2, the transistor temperature Ttr when the torques of the two motors MG1, MG2 are zero is measured with the temperature sensor 312.

At step S3, the water temperature Tw is estimated from an envelope curve of the transistor temperature Ttr when the torque is zero, as follows. When the torques of the two motors are zero, as shown in FIG. 11 described above, the transistor temperature Ttr drops down almost to the water temperature Tw. Therefore, the water temperature Tw at this time can be estimated by using the foregoing equation (16).

At step S4, the variation of the water temperature Tw' when the toques of the two motors are zero is estimated by using the initial value of the outside ambient temperature Tair. The variation of the water temperature Tw' when the torques of the two motors are zero is given by the following equation (18) that is obtained by substituting zeros for the second and third terms on the right side of the foregoing equation (17):

$$Tw'(i)=Tw'(i-1)-K63[Twi(i-1)-Tair(i-1)], \quad (18).$$

As can be understood from this equation, the cooling water CLW is cooled by the outside air, and its temperature decreases gradually as shown in the right end of FIG. 11. If the actual outside ambient temperature Tair agrees with the initial value being set at step S1, the water temperature Tw estimated by using the equation (16) is supposed to agree with the water temperature Tw' estimated by using the equation (18). Then, at step S5, the outside ambient temperature Tair is modified so that these two estimated values of the water temperatures Tw, Tw' agree with each other.

At step S6, it is examined whether or not the modified outside air temperature is in a predetermined range that is considered to be normal. For example, as a normal range of the outside ambient temperature, a range of −40 to +60EC is set.

If the modified outside ambient temperature Tair is not within the normal range, the driver is given a warning that the outside ambient temperature sensor is abnormal at step S8.

Incidentally, for causes of malfunctioning, there can be considered several causes such as the pump 402 of the cooling system and the temperature sensor 312 of the transistor 300. On the other hand, if the modified outside ambient temperature Tair is within the normal range, the flow proceeds to step S7 where, by using this modified outside ambient temperature Tair, the water temperature Tw at an arbitrary time can be estimated according to the equation (17). Incidentally, this modified outside ambient temperature may be used as the initial value in the next trip. Here, "trip" means one traveling operation of the vehicle (from key-on to key-off).

When the outside ambient temperature has been estimated thus, the water temperature Tw can be estimated by using the foregoing equation (17) even in the case where the torques of the two motors MG1, MG2 are not zero. Further, by using the foregoing equation (7) or (8), the transistor temperature Ttr can be inversely estimated from this water temperature Tw. If the transistor temperature thus inversely estimated is considerably different from the temperature measured by the temperature sensor 312, there is a possibility that the temperature sensor 312 is malfunctioning. That is, it is possible to detect whether or not the temperature sensor 312 is malfunctioning by using the estimated water temperature Tw.

Incidentally, if the hybrid vehicle is provided with a temperature sensor for measuring the outside ambient temperature, the measured value of the temperature sensor can be used as the outside ambient temperature in the foregoing equation (17). Moreover, it is possible to detect whether or not the outside ambient temperature sensor or the cooling system is malfunctioning by knowing whether or not the this measured value of the outside ambient temperature agrees with an estimated value of the outside ambient temperature obtained at step S5 of FIG. 13.

Generalizing the estimation of the cooling water temperature described here, it is possible that: first the temperature of the first object (the cooling water temperature) is estimated by using the temperature of the second object (transistor temperature or outside ambient temperature) measured by the temperature sensor; and then the temperature of the second object is inversely estimated on the basis of the temperature of the first object, the temperature increment component and the temperature decrement component in the second object. Then, it is possible to detect whether or not the temperature sensor is malfunctioning by checking the difference between the temperature of the second object that was inversely estimated and the temperature measured by the temperature sensor.

Incidentally, one of two causes of malfunctioning is the temperature sensor of the second object, and the other is at least one of the cooling systems for the first object and for the second object. Therefore, it is possible to detect that at least one of these two constituents is malfunctioning. Incidentally, a variety of temperature estimations described in the embodiments are achieved by a CPU that is in the master control part 270 (but not shown in the figures) executing a predetermined program for estimating a temperature. This computer program is stored in ROM that is in the master control part 270 (but not shown in the drawings). Therefore, the master control part 240 corresponds to the estimation part in the invention. Incidentally, the temperature determination part in the invention is realized with various temperature sensors. However, in the case where the temperature of a region in which no temperature sensor is installed is determined, the master control part 270 also functions as the temperature determination part.

H. Modified Examples

Note that the invention is not limited to the embodiments but can be put into practice in a variety of forms within a scope that does not deviate from its essential points; for example, a variant as in the following is possible.

H1. Modified Example 1

In the embodiments, the hybrid vehicle of the so-called mechanical distribution type where the power of the engine is distributed to both the axle shaft and the first motor MG1 with the use of the planetary gear. However, the invention may be applied to the hybrid vehicle of the so-called electric distribution type where the power of the engine is distributed electrically with the use of the motor/generator, without using a planetary gear. The hybrid vehicle of the electric distribution type is disclosed by, for example, Japanese Patent Laid-open Publication No. H9-46965 applied by the present inventors. Accordingly its explanation will be omitted.

Further, the invention can be applied to other vehicles than hybrid vehicles. Moreover, the invention can be applied to temperature estimation and detection of malfunctioning in a variety of machines and apparatuses other than vehicles.

What is claimed is:

1. A method of estimating a temperature and detecting an abnormality, comprising the steps of:

(a) specifying a first object;

(b) specifying an energizable second object that generates heat upon an energization thereof, wherein said second object exhibits a temperature change in response to heat which is more rapid than a temperature change of the first object in response to heat, and wherein said second object is positioned in the vicinity of the first object for exchanging heat therebetween such that said second object assumes a temperature approximately equal to that of the first object in the absence of heat generation therein;

(c) measuring the temperature of one of the first and second objects by a temperature detector;

(d) estimating the temperature of the other of the first and second objects using a first method in which the temperature of the other of the first and second objects is estimated on the basis of the temperature measured in the step (c) and a specific value that substantially indicates the amount of the energization of the second object;

(e) estimating the temperature of the other of the first and second objects using a second method which is different from said first method; and (f) detecting an abnormality of at least one of the detector, a system for the first object and a system for the second object based on the temperature estimated by the first method and the temperature estimated by the second method.

2. A method according to claim 1, wherein, when the temperature of the first object is assumed as T1, the temperature of the second object as T2, and a temperature increment quantity of the second object that is related to the specific value substantially indicating the amount of the energization as $\Delta T$, a relation between the temperature increment quantity $\Delta T$ and the specific value substantially indicating the amount of the energization is preliminarily set, and the estimation in the step (d) is executed according to the following equation; $T2=T1+\Delta T$.

3. A method according to claim 2, wherein the second object is a power semiconductor, wherein the first object is a coolant for cooling the power semiconductor element, and wherein the step (d) includes a process of determining the temperature increment quantity $\Delta T$ in accordance with a specific value that substantially indicates the amount of energization of the power semiconductor element from the relation between the predetermined temperature increment quantity ΔT and the specific value substantially indicating the amount of energization of the semiconductor element.

4. A method according to claim 1, wherein the second object is a power semiconductor element, wherein the first object is a coolant for cooling the power semiconductor element, wherein the step (c) includes a process of measuring the temperature of the power semiconductor element with a temperature sensor installed on the power semiconductor element, and wherein the step (d) includes a process of determining the temperature of the coolant from the temperature change of the power semiconductor element in a state where the power semiconductor element is not energized.

5. A temperature estimation device for estimating a temperature of one of first and the second objects from the temperature of the other object, and for detecting an abnormality, comprising:

a temperature measuring portion for measuring the temperature of one of the first and second objects by a temperature detector; and an estimation portion for estimating the temperature of the other of the first and second objects using a first method in which the temperature of the other of the first and second objects is estimated on the basis of the temperature measured by the temperature determination portion and a specific value substantially indicating the amount of energization of the second object, for estimating the temperature of the other of the first and second objects using a second method which is different from said first method, and for detecting an abnormality of at least one of the detector, a system for the first object and a system for the second object based on the temperature estimated by the first method and the temperature estimated by the second method, wherein the second object is an energizable object that generates heat upon an energization thereof, wherein said second object exhibits a temperature change in response to heat which is more rapid than a temperature change of the first object in response to heat, and wherein said second object is positioned in the vicinity of the first object for exchanging heat therebetween such that said second object assumes a temperature approximately equal to that of the first object in the absence of heat generation therein.

6. A device according to claim 5, wherein, when the temperature of the first object is assumed as T1, the temperature of the second object as T2, and a temperature increment quantity of the second object that is related to the specific value substantially indicating the amount of the energization as ΔT, a relation between the temperature increment quantity ΔT and the specific value substantially indicating the amount of the energization is preliminarily set, and the estimation by the estimation portion is executed according to the following equation:

$$T2=T1+\Delta T.$$

7. A device according to claim 6, wherein the second object is a power semiconductor, wherein the first object is a coolant for cooling the power semiconductor element, and wherein the estimation portion determines the temperature increment quantity ΔT in accordance with a specific value that substantially indicates the amount of energization of the power semiconductor element from the relation between the predetermined temperature increment quantity ΔT and the specific value substantially indicating the amount of energization of the semiconductor element.

8. A device according to claim 5, wherein the second object is a power semiconductor element, wherein the first object is a coolant for cooling the power semiconductor element, wherein the temperature determination portion measures the temperature of the power semiconductor element with a temperature sensor installed on the power semiconductor element, and wherein the estimation portion determines the temperature of the coolant from the temperature change of the power semiconductor element in a state where the power semiconductor element is not energized.

* * * * *

UNITED STATES PATENT AND TRADEMARK OFFICE
CERTIFICATE OF CORRECTION

PATENT NO.     : 6,854,881 B2
DATED          : February 15, 2005
INVENTOR(S)    : Mitsuhiro Nada It is certified that error appears in the above-identified patent and that said Letters Patent is hereby corrected as shown below:

Title page,
Item [57], under the ABSTRACT portion, the number of Claims should read:
-- [57] 14 Claims --

Column 18,
Line 58, delete ";" and insert -- : --.

Column 19,
Line 4, delete "1" and insert -- 2 --;
Line 4, delete "second" and insert -- first --;
Line 5, delete "power semiconductor element " and insert -- stator iron core of an electric motor --;
Line 6, delete "first" and insert -- second --;
Lines 6-7, delete "coolant for cooling the power semiconductor element," and insert -- stator coil of the electric motor, and --;
Lines 8-11, delete "wherein the step (c) includes a process of measuring the temperature of the power semiconductor element with a temperature sensor installed on the power semiconductor element, and";
Lines 13-15, delete "of the coolant from the temperature change of the power semiconductor element in a state where the power semiconductor element is not energized" and insert -- increment quantity $\Delta T$ in accordance with a specific value substantially indicating the amount of energization of the electric motor from the relation between the predetermined temperature increment quantity $\Delta T$ and the specific value substantially indicating the amount of energization of the electric motor --; and
Lines 16-41, delete the entire contents of Claim 5 and insert
-- 5. A method according to claim 4, wherein the step (c) includes a process of determining the temperature of the stator iron core on the basis of the temperature of a coolant for cooling the stator of the electric motor and the specific value substantially indicating the amount of energization of the electric motor --.

Column 20,
Lines 1-5, delete the entire contents of the remaining portion of Claim 5;
Lines 6-17, delete the entire contents of Claim 6 and insert -- 6. A method according to claim 1, wherein the second object is a stator iron core of an electric motor, wherein the first object is a coolant for cooling the stator of the electric motor, and wherein the step (d) includes a process of determining the temperature of the stator iron core on the basis of the coolant temperature and a specific value substantially indicating the amount of energization of the electric motor. --;

UNITED STATES PATENT AND TRADEMARK OFFICE
CERTIFICATE OF CORRECTION

PATENT NO. : 6,854,881 B2
DATED : February 15, 2005
INVENTOR(S) : Mitsuhiro Nada It is certified that error appears in the above-identified patent and that said Letters Patent is hereby corrected as shown below:

Column 20 (cont'd),
Lines 18-40, delete the entire contents of Claims 7 and 8 and insert -- 7. A method according to claim 1, wherein the second object is a power semiconductor element,
   wherein the first object is a coolant for cooling the power semiconductor element,
   wherein the step (c) includes a process of measuring the temperature of the power semiconductor element with a temperature sensor installed on the power semiconductor element, and
   wherein the step (d) includes a process of determining the temperature of the coolant from the temperature change of the power semiconductor element in a state where the power semiconductor element is not energized.

8. A temperature estimation device for estimating a temperature of one of the first and second objects from the temperature of the other object, and for detecting an abnormality, comprising:
   a temperature measuring portion for measuring the temperature of one of the first and second objects by a temperature detector; and
   an estimation portion for estimating the temperature of the other of the first and second objects using a first method in which the temperature of the other of the first and second objects is estimated on the basis of the temperature measured by the temperature determination portion and a specific value substantially indicating the amount of energization of the second object, for estimating the temperature of the other of the first and second objects using a second method which is different from said first method, and for detecting an abnormality of at least one of the detector, a system for the first object and a system for the second object based on the temperature estimated by the first method and the temperature estimated by the second method,
   wherein the second object is an energizable object that generates heat upon an energization thereof, wherein said second object exhibits a temperature change in response to heat which is more rapid than a temperature change of the first object in response to heat, and wherein said second object is positioned in the vicinity of the first object for exchanging heat therebetween such that said second object assumes a temperature approximately equal to that of the first object in the absence of heat generation therein.

9. A device according to claim 8, wherein, when the temperature of the first object is assumed as T1, the temperature of the second object as T2, and a temperature increment quantity of the second object that is related to the specific value substantially indicating the amount of the energization as $\Delta T$, a relation between the temperature increment quantity $\Delta T$ and the specific value substantially indicating the amount of the energization is preliminarily set, and the estimation by the estimation portion is executed according to the following equation: $T2 = T1 + \Delta T$.

UNITED STATES PATENT AND TRADEMARK OFFICE
CERTIFICATE OF CORRECTION

PATENT NO. : 6,854,881 B2
DATED : February 15, 2005
INVENTOR(S) : Mitsuhiro Nada It is certified that error appears in the above-identified patent and that said Letters Patent is hereby corrected as shown below:

Column 20 (cont'd),
10. A device according to claim 9, wherein the second object is a power semiconductor,
   wherein the first object is a coolant for cooling the power semiconductor element, and wherein the estimation portion determines the temperature increment quantity $\Delta T$ in accordance with a specific value that substantially indicates the amount of energizaiton of the power semiconductor element from the relation between the predetermined temperature increment quantity $\Delta T$ and the specific value substantially indicating the amount of energization of the semiconductor element.

11. A device according to claim 9, wherein the first object is a stator iron core of an electric motor,
   wherein the second object is a stator coil of the electric motor, and
   wherein the estimation portion determines the temperature increment quantity $\Delta T$ in accordance with a specific value substantially indicating the amount of energization of the electric motor from the relation between the predetermined temperature increment quantity $\Delta T$ and the specific value substantially indicating the amount of energization of the electric motor.

12. A device according to claim 11, wherein the temperature determination portion determines the temperature of the stator iron core on the basis of the temperature of a coolant for cooling the stator of the electric motor and the specific value substantially indicating the amount of energization of the electric motor.

13. A device according to claim 8, wherein the second object is a stator iron core of an electric motor,
   wherein the first object is a coolant for cooling the stator of the electric motor, and
   wherein the estimation portion determines the temperature of the stator iron core on the basis of the coolant temperature and a specific value substantially indicating the amount of energization of the electric motor.

UNITED STATES PATENT AND TRADEMARK OFFICE
CERTIFICATE OF CORRECTION

PATENT NO.    : 6,854,881 B2
DATED         : February 15, 2005
INVENTOR(S)   : Mitsuhiro Nada Page 4 of 4

It is certified that error appears in the above-identified patent and that said Letters Patent is hereby corrected as shown below:

<u>Column 20 (cont'd),</u>
14. A device according to claim 8, wherein the second object is a power semiconductor element,
    wherein the first object is a coolant for cooling the power semiconductor element,
    wherein the temperature determination portion measures the temperature of the power semiconductor element with a temperature sensor installed on the power semiconductor element, and
    wherein the estimation portion determines the temperature of the coolant from the temperature change of the power semiconductor element in a state where the power semiconductor element is not energized. --.

Signed and Sealed this

Twenty-third Day of August, 2005

JON W. DUDAS
*Director of the United States Patent and Trademark Office*